United States Patent [19]

Wedlake

[11] 4,269,905
[45] May 26, 1981

[54] ELECTROCHEMICAL CELL AND THE PROTECTION OF AN ELECTROCHEMICAL CELL

[75] Inventor: Roger J. Wedlake, Johannesburg, South Africa

[73] Assignee: South African Inventions Development Corp., Pretoria, South Africa

[21] Appl. No.: 97,949

[22] Filed: Nov. 28, 1979

[51] Int. Cl.³ .......................................... H01M 14/00
[52] U.S. Cl. .......................................... 429/8; 429/48; 429/121; 429/122
[58] Field of Search ............... 429/122, 121, 8, 48, 429/101–104

[56] References Cited

U.S. PATENT DOCUMENTS

| | | | |
|---|---|---|---|
| 4,137,376 | 1/1979 | Clegg | 429/104 |
| 4,164,608 | 8/1979 | Coetzer | 429/218 |
| 4,184,007 | 1/1980 | Urry | 429/8 |

FOREIGN PATENT DOCUMENTS 1526588  9/1978  United Kingdom.

*Primary Examiner*—Charles F. LeFevour
*Attorney, Agent, or Firm*—Arnold, White & Durkee

[57] ABSTRACT

A method and means for reducing the potential hazard presented by escaping electrochemical cell contents are disclosed. The invention involves associating a micromolecular sieve carrier with the cell to sorb such contents when they escape, to reduce the severity of undesired reactions of such contents. The sieve carrier is conveniently associated with the cell by being provided in a layer, e.g. in a holder, around the cell.

26 Claims, 3 Drawing Figures

ELECTROCHEMICAL CELL AND THE PROTECTION OF AN ELECTROCHEMICAL CELL

This invention relates to an electrochemical cell and to the protection of an electrochemical cell.

Electrochemical cells within a battery thereof are capable of failure and have been known to fail. In high temperature electrochemical cells in particular, such failure can cause catastrophic safety hazards. The larger the electrochemical cell or battery thereof, the worse this problem becomes.

For battery driven cars, to drive an average car for about 300 Km, a battery storing in the region of 50 KW hrs is required. Should all this energy or a substantial proportion thereof, suddenly be released, then the battery would be subject to catastrophic and explosive failure. Such failure can easily become a reality if some of the presently available high temperature batteries are installed in vehicles as is intended, and such vehicles crash.

Leading contenders for commercial vehicle batteries are sodium/sulphur batteries and lithium/sulphide batteries. In the medium term, alkaline batteries typified by zinc/nickel oxide batteries, are also contenders.

For such batteries, a very high energy density is required, which can only be met by using combinations of the most reactive chemical substances, such as the extremely electropositive elements lithium or sodium, together with extremely electronegative elements such as sulphur, chlorine or the like. The mere use of such materials creates intrinsic safety problems, which safety problems exist in the exploitation of such batteries from the research stage, through development and to commercial production and use thereof, for example in vehicles.

In such batteries, the chemical reaction between the reactive species in the battery is controlled to provide useful electrical energy. However, in the event of such reaction's becoming uncontrolled, catastrophic and dangerous safety hazards can arise. This can occur for example in a motor vehicle crash, which forces the reactive materials of the battery electrochemical cell anodes and cathodes together. Such failures can also occur from corrosion of the cell housing which can occur over a long period of in service use or storage, and thermal cycling which can cause stresses and strains which can crack brittle seals and other brittle components, such as solid electrolytes in sodium/sulphur cells.

Said corrosion or thermal cycling will generally cause a particular cell to undergo exothermic destructive failure. When the cell is used in a battery, it is thus necessary to prevent such individual cell failures from spreading to neighbouring cells and hence causing the catastrophic runaway cascade failure of the entire battery.

Means which have been proposed of overcoming the problem of catastrophic cell/battery failure all involve significant disadvantages in terms of additional undesired weight or volume requirements. Thus vermiculite and similar minerals have been used to surround such batteries and cells, acting merely as low density, non-imflammable thermal insulation, in a physical fashion on a macroscopic level, rather than by dealing with cell contents on a molecular or microscopic level or in a chemical fashion.

Consequently, unless the problem of catastrophic battery failure can be solved, commercial end use of many of presently proposed batteries under development, may be restricted to technically competent end-users, and safety hazards can prevent them from entering the important mass market of vehicle production.

In accordance with the invention a method of reducing the potential hazard presented by electrochemical cell contents escaping from an electrochemical cell, includes the step of associating a sorbent micromolecular sieve material with an electrochemical cell to sorb electrochemical cell contents escaping from the cell.

The cell contents are potentially dangerous and hazardous electrochemical reactants and/or reaction products.

The molecular sieve material may conveniently be provided in at least one sealed layer which is sealed and which surrounds, or partially surrounds, the cell casing.

In an embodiment of the invention, the molecular sieve material may be provided in a sealed layer between the cell casing and an outer sealing wall which seals the material.

In an alternative embodiment of the invention, the molecular sieve material may be provided in a sealed holder which is shaped to receive or removably to receive a cell casing, the holder comprising sealingly connected inner and outer sealing walls between which the molecular sieve material is sealed.

The sealing walls may conveniently be of fracture resistant material, such as a flexible or resiliently flexible material, or a deformable or resiliently deformable material to resist fracture under impact.

The sealed molecular sieve material may, if it contains sorbed water as in zeolites, conveniently be at least partially dehydrated to improve its capacity to sorb electrochemical cell contents.

In an embodiment of the invention, the sealed molecular sieve material may be evacuated so as to improve its thermal insulation properties.

In an alternative embodiment of the invention, the sealed molecular sieve material may include an inert gas which is inert in relation to the electrochemical cell contents.

The inert gas may thus, for example, be a noble gas, nitrogen, carbon dioxide or the like.

The invention further extends to an electrochemical cell which has a sorbent micromolecular sieve material associated therewith for sorbing electrochemical cell contents escaping from the cell thereby reducing the potential hazard presented by such escaping contents.

The invention further extends to a sealed holder which is shaped to receive or removably to receive an electrochemical cell, the holder comprising sealingly connected inner and outer sealing walls between which a sorbent molecular sieve material is provided.

While this invention can have application in regard to various types of electrochemical cells including electrochemical cells in the form of fuel cells, it can have particular application in regard to electrochemical cells which utilize electrochemical substances or electrolytes, or which produce reaction products which are hazardous upon escaping from a cell, or which are potentially hazardous if they react with one another or the air outside a cell environment.

Thus, for example, the invention can have particular application in regard to high temperature cells, in regard to molten electrolyte cells, in regard to cells employing molten or potentially hazardous electronegative and/or electropositive substances, or the like.

The micromolecular sieve material of this invention may be any material which is capable of rapidly sorbing electrochemical cell contents which escape from a cell to reduce the potential hazards presented by such contents by retaining them in a dispersed form to allow them to cool or to reduce the possibility or extent or rate of their reaction with air or with one another.

Micromolecular sieve materials are materials which have molecular cavities in the form of cages, pores or channels, with the cavities having windows leading to them, the windows, cages, pores and channels having an average size of not more than 1 Micron, preferably less than 100 Angstroms and typically less than 20 Angstroms.

The window sizes of the material should therefore be sufficiently large to permit ready entry of the electrochemical cell contents to be sorbed by the material, and the cavities should preferably be such that the cell contents can be held sufficiently captive therein for a sufficient period to reduce the potential hazards presented by such contents.

Furthermore, the micromolecular sieve material may be chosen so that it has a pore size which allows only one of the species of cell contents to be sorbed therein, such sorbed species thus being isolated from the other cell contents.

Various types of natural and synthetic molecular sieve materials are known and they are widely used in industry for purification, scavenging and separation. Furthermore, because of the demand for these materials, they are being thoroughly investigated and new molecular sieve materials are being developed and manufactured throughout the world.

The micromolecular sieve material may be present in any convenient form, e.g. powder, pellets, porous artifacts or porous bodies.

By taking into consideration factors such as window size, cavity size, the ability rapidly to sorb electrochemical cell contents, and the ability to hold such contents captive sufficiently dispersed to reduce the potential hazards presented by such contents, a rough guide will be provided for the selection of appropriate molecular sieve materials.

Further factors which can serve as a guide, can be the degree of porosity, the density, the availability, the cost, and the stability of the molecular sieve materials.

The exact type of molecular sieve chosen will depend on the exact chemistry of the cell in question. Thus the molecular sieve should be:

(a) stable at temperatures above the working temperature range of the cell;

(b) the micromolecular sieve material may be stable against reaction with any of the contents of the cell which may be emitted therefrom. However, if the sieve material does react with such contents, it should preferably do so endothermically; and (c) the sieve material should be low in density, inexpensive and preferably a good thermal insulator.

On the basis of factors such as these, molecular sieve materials such as clathrates, carbon molecular sieves, composite carbon molecular sieves, and certain sorbent natural or synthetic mineral substances (i.e. mineral molecular sieves) such as tectosilicates, modified tectosilicates, and tectosilicate-like substances may be considered.

Tectosilicates are particularly favoured for use with sodium/sulphur high temperature cells, as many tectosilicates readily sorbed sodium, sulphur and sodium polysulphides. Zeolitic tectosilicates are particularly preferred in this respect.

Suitable mineral micromolecular sieve carriers thus may be selected from the group of substances which make up the tectosilicates, i.e. the class of substances also known as "framework silicates" which may be natural or synthetic, crystalline or non-crystalline/amorphous, and which include:

(a) silicates such as silica gel
(b) zeolites
(c) felspars and
(d) felspathoids (b), (c) and (d) being silicates of a structural type in which all four oxygen atoms of the silicate tetrahedra are shared with neighbouring tetrahedra. The framework of the tectosilicate is made up of silicon with in some cases aluminium atoms, together with other atoms. Mineral micromolecular sieve carriers include also mixtures of or analogues of tectosilicates in which the silicon and/or aluminium atoms of the framework may be substituted by atoms of one or more of:

iron
beryllium
boron
phosphorous
carbon
germanium and
gallium in minor or major proportions and wherein the micromolecular sieving characteristics and properties are maintained.

Many tectosilicates are cheap and abundant and are essentially non-imflammable. In use according to the invention they may, if desired, be mixed with substances which are not molecular sieves, e.g. glass fibre or vermiculite, which act as fillers to provide additional volume and thermal insulation properties.

In a specific embodiment of the invention, the molecular sieve material may comprise natural or synthetic zeolites, or modified zeolites which have been physically or chemically modified but still possess appropriate molecular cavities for sorbing electrochemical cell contents.

Zeolites contain water molecules which may be removed, usually reversibly, by heat and/or evacuation.

Some modified zeolites may be particularly suitable, particularly those known as "superstable" or "ultrastable" zeolites. One such group of ultrastable or superstable zeolites is formed by a decationisation process which results in the formation of a zeolite-like molecular sieve material that is stable up to 1000° C. (see Donald W. Breck—"Zeolite Molecular Sieves"—Wiley Interscience, 1973).

Where zeolites (or other hydrated tectosilicates) are therefore used as the molecular sieve material in this invention, they may conveniently be dehydrated or at least partially dehydrated to improve their ability to sorb electrochemical cell contents.

An advantage in using dehydrated zeolites or either dehydrated tectosilicates, is that they readily sorb water and hence in use according to the invention will act to prevent rusting or similar water-aided corrosion of the cell container. This water can get in, for example in the event of a failure of the outer battery casing.

Without wishing to limit the scope of this application, it may be noted that "zeolites" are usually identified as the class of crystalline or amorphous natural or synthetic materials which contain aluminium and silicon in fairly definite proportions, and their analogues. For a more detailed discussion of zeolites reference can be made to the January 1975 publication of the International Union of Pure and Applied Chemistry entitled: "Chemical Nomenclature, and Formulation of Compositions, of Synthetic and Natural Zeolites".

In a specific embodiment of the invention, the molecular sieve material may be in the form of a typical zeolite such as zeolite 3A, zeolite 4A, zeolite 13X, or the like.

In an alternative embodiment of the invention, for example, the zeolite may be in the form of naturally occurring zeolite crystals selected, for example, from the group comprising erionite and faujasite crystals.

It will be appreciated that this invention can be applied to electrochemical cells as well as to batteries of such cells.

Where the invention is applied to a battery of cells, molecular sieve material layers may be associated with each of the cells and/or with the battery itself.

In accordance with the invention associating the sorbent micromolecular sieve material with the electrochemical cell may be by having means (activated, for example automatically, by cell failure) arranged to apply the micromolecular sieve material to the cell or its vicinity. Thus, a container similar to a fire extinguisher provided with propellent and micromolecular sorbent sieve material could be associated with the cell, and connected to the cell so that cell failure causes such dispenser to spray the micromolecular sieve material over and around the cell when failure occurs.

Embodiments of the invention are now described and illustrated by way of example with reference to accompanying drawings, in which.

Figure 1:
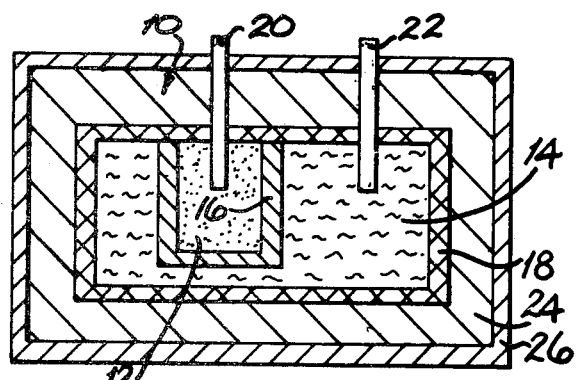
FIG. 1 shows a fragmentary, diagrammatic representation of a typical electrochemical cell which has been protected in accordance with this invention to reduce the potential hazards presented by electrochemical cell contents escaping from the cell.
Figure 2:
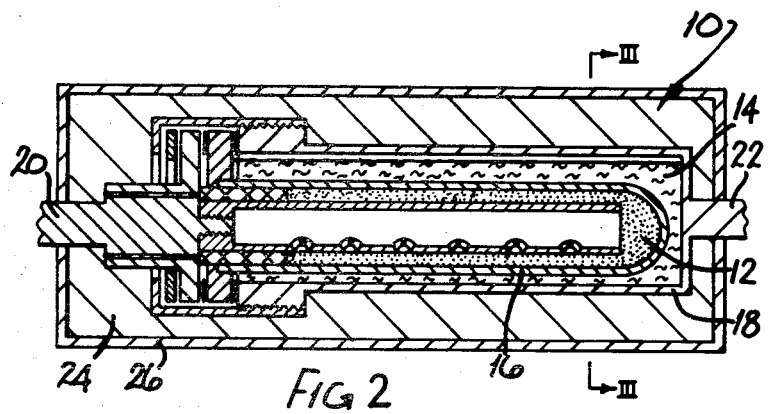
FIG. 2 shows a diagrammatic sectional side elevation of an experimental electrochemical cell protected according to the invention.
Figure 3:
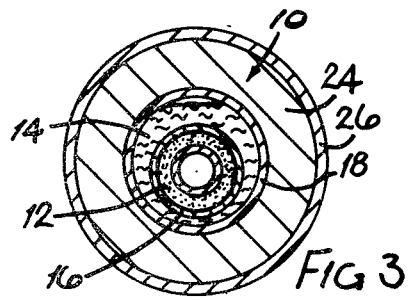
FIG. 3 shows a sectional end elevation of the cell of FIG. 1, in the direction of line III—III in FIG. 2.

With reference to the drawing, reference numeral 10 refers generally to a typical electrochemical cell.

In the embodiments illustrated, the cells 10 are each in the form of a high temperature cell comprising a molten sulphur/polysulphide cathode 12, a molten sodium anode 14, and a solid $\beta$-alumina or nasicon electrolyte 16 which separates the anode 14 from the cathode 12.

The cell 10 includes a casing 18 wherein the cell contents are sealingly housed.

The cell 10 includes a conducting terminal 20 for the cathode 12, and a conducting terminal 22 for the anode 14.

It will be appreciated that, in accordance with this invention, the typical cell 10 may instead, for example, be in the form of a cell which has a molten or liquid electrolyte, and which has an anode or cathode which is solid or liquid.

The cell 10 is completely surrounded by a layer 24 of dehydrated zeolite 13X crystals which are maintained in a sealed condition by an outer sealing wall 26.

The outer sealing wall 26 is preferably of a fracture resistant, lightweight material which will resist fracture particularly under impact.

In use, if any of the electrochemical reactants of the cell 10 escape from the cell 10 either as a result of corrosion of the casing 18 or as a result of an impact, electrochemical cell contents escaping from the cell 10 will be effectively sorbed by the zeolite layer 24, and should be held captive sufficiently to allow them to cool down or to combat a violent reaction upon contact with each other, or upon exposure to the air, thereby reducing the potential hazard presented by the escape of such electrochemical contents.

The embodiments of the invention as illustrated in the drawings can provide the advantage that they can reduce the potential hazard presented by electrochemical contents escaping out of an electrochemical cell either as a result of corrosion or as a result of an impact which inverts the cell or fractures the cell components.

The embodiments of the invention can therefore reduce the potential health and fire hazards resulting from a vehicle to which such cells are fitted, being involved in an accident.

The embodiments of the invention can provide the further advantage that they can reduce the risk of a cascade effect as a result of cell failure in a multi-celled battery. Thus, for example, where one cell of a battery fractures as a result of an impact or as a result of corrosion, corrosive cell contents can be captured, thereby reducing the risk of a reaction which can damagingly heat adjacent cells or reducing the risk of the corrosive materials corroding adjacent cells.

The embodiments as illustrated in the drawing can provide the further advantage that the zeolite layer can also act as light and effective thermal insulator for the cell. This is particularly advantageous for high temperature cells.

The embodiments as illustrated in the drawing can provide the further advantage that zeolite is relatively cheap and plentiful. In addition, while such a layer and its sealing wall will add additional mass to a cell, the mass should be relatively insignificant in relation to the advantages which can be provided.

Although not shown in the drawings it will be appreciated that instead of the constructions shown, the layer 24 can be provided in a separate holder. This holder will have the layer 24 sandwiched between an outer sealing wall such as the wall 26 shown in the drawings, and an inner sealing wall (not shown) of similar construction. The holder will have a hollow interior, defined by the inner sealing wall, for receiving the cell, and access for the cell to the hollow interior will be provided, optionally so that the cell is later removable.

I claim:

1. A method of reducing the potential hazard presented by electrochemical cell contents escaping from an electrochemical cell, which method includes the step of associating a sorbent micromolecular sieve material with an electrochemical cell to sorb the electrochemical cell contents escaping from the cell, the micromolecular sieve material being sealed off from said cell contents and the cavities in the micromolecular sieve material being substantially free of said cell contents, and said material having an average window size of less than 1 micron leading into its internal cavities the window size being selected such as to permit rapid sorption of the cell contents into said cavities, effectively to reduce the potential hazard.

2. A method as claimed in claim 1, in which the molecular sieve material is provided in at least one sealed layer which is sealed and which surrounds, or partially surrounds, the cell casing.

3. A method as claimed in claim 1, in which the sieve material is provided in a sealed layer between the cell casing and outer sealing wall which seals the material.

4. A method as claimed in claim 1, in which the sieve material is provided in a sealed holder which is shaped to receive or removably to receive a cell casing, the holder comprising sealingly connected inner and outer sealing walls between which the molecular sieve material is sealed.

5. A method as claimed in claim 3 in which each sealing wall is of fracture resistant material.

6. A method as claimed in claim 1, in which the sieve material is capable of containing sorbed water, and is at least partially dehydrated to improve its capacity to sorb electrochemical cell contents.

7. A method as claimed in claim 1, in which the sealed sieve material is evacuated so as to improve its thermal insulation properties.

8. A method as claimed in claim 1, in which the sealed sieve material includes an inert gas which is inert in relation to the cell contents.

9. A method as claimed in claim 1, in which the sieve material is selected from the group consisting in clathrates, carbon molecular sieves, composite carbon molecular sieves, tectosilicate molecular sieves, modified tectosilicate molecular sieves and tectosilicate-like molecular sieves.

10. A method as claimed in claim 9, in which the molecular sieve material comprises one or more tectosilicates.

11. A method as claimed in claim 10, in which the molecular sieve material comprises one or more zeolites.

12. A method as claimed in claim 11, in which the molecular sieve material comprises one or more zeolites selected from the group consisting in ultrastable or superstable zeolites.

13. A method as claimed in claim 1, in which the micromolecular sieve material is chosen so that it has a pore size which allows only one species of the cell contents to be sorbed therein.

14. An electrochemical cell which has a sorbent micromolecular sieve material associated therewith for sorbing electrochemical cell contents escaping from the cell thereby reducing the potential hazard presented by such escaping contents, the micromolecular sieve material being sealed off from said cell contents and the cavities in the micromolecular sieve material being substantially free of said cell contents, and said material having an average window size of less than 1 micron leading into its internal cavities the window size being selected such as to permit rapid sorption of the cell contents into said cavities, effectively to reduce the potential hazard.

15. A cell as claimed in claim 14, in which the sieve material is provided in at least one sealed layer which is sealed and which surrounds, or partially surrounds, the cell casing.

16. A cell as claimed in claim 14, in which the sieve material is provided in a sealed layer between the cell casing and an outer sealing wall which seals the material.

17. A cell as claimed in claim 14, in which the molecular sieve material is provided in a sealed holder which is shaped to receive or removably to receive a cell casing, the holder comprising sealingly connected inner and outer sealing walls between which the molecular sieve material is sealed.

18. A cell as claimed in claim 16, in which each sealing wall is of fracture resistant material.

19. A cell as claimed in claim 14, in which the sieve material is capable of containing sorbed water, and is at least partially dehydrated to improve its capacity to sorb electrochemical cell contents.

20. A cell as claimed in claim 14, in which the sealed sieve material is evacuated so as to improve its thermal insulation properties.

21. A cell as claimed in claim 14, in which the sealed sieve material includes an inert gas which is inert in relation to the reactants, to improve the thermal insulation properties of the material.

22. A cell as claimed in claim 14, in which the sieve material is selected from the group consisting in clathrates, carbon molecular sieves, composite carbon molecular sieves, tectosilicate molecular sieves, modified tectosilicate molecular sieves and tectosilicate-like molecular sieves.

23. A cell as claimed in claim 22, in which the molecular sieve material comprises one or more tectosilicates.

24. A cell as claimed in claim 23, in which the molecular sieve material comprises one or more zeolites.

25. A cell as claimed in claim 24, in which the molecular sieve material comprises one or more zeolites selected from the group consisting in ultrastable or superstable zeolites.

26. A cell as claimed in claim 14, in which the micromolecular sieve material is chosen so that it has a pore size which allows only one species of the cell contents to be sorbed therein.

* * * * *